US012654439B2

(12) United States Patent
Praharaj et al.

(10) Patent No.: US 12,654,439 B2
(45) Date of Patent: Jun. 16, 2026

(54) SYSTEM AND METHOD FOR CONTROLLING INKJET OPERATION IN AN INKJET PRINTER USING IMAGE CONTENT DATA

(71) Applicant: Xerox Corporation, Norwalk, CT (US)

(72) Inventors: Seemit Praharaj, Webster, NY (US); Jason M. LeFevre, Penfield, NY (US); Douglas K. Herrmann, Webster, NY (US); Varun Sambhy, Pittsford, NY (US)

(73) Assignee: GENESEE VALLEY INNOVATIONS, LLC, Santa Clara, CA (US)

( * ) Notice: Subject to any disclaimer, the term of this patent is extended or adjusted under 35 U.S.C. 154(b) by 155 days.

(21) Appl. No.: 18/326,138

(22) Filed: May 31, 2023

(65) Prior Publication Data

US 2024/0399738 A1 Dec. 5, 2024

(51) Int. Cl.

*B41J 29/38* (2006.01)
*B41J 2/045* (2006.01)

(52) U.S. Cl.

CPC ....... *B41J 2/04535* (2013.01); *B41J 2/04586* (2013.01); *B41J 2/04588* (2013.01)

(58) Field of Classification Search

CPC . B41J 2/04535; B41J 2/04586; B41J 2/04588
See application file for complete search history.

(56) References Cited

U.S. PATENT DOCUMENTS 10,814,620 B1 10/2020 Praharaj et al.
2009/0189933 A1* 7/2009 Nakano ................ B41J 2/16579 347/19
2011/0234676 A1* 9/2011 Nishikawa ............. B41J 29/393 347/19
2012/0200624 A1 8/2012 Zhou et al.
2013/0201233 A1 8/2013 Zhang et al.
2014/0362135 A1 12/2014 Terayama et al.
2017/0239944 A1 8/2017 Martin et al.
2019/0054740 A1 2/2019 Darling et al.
2021/0362490 A1 11/2021 Martin et al.
2021/0402761 A1 12/2021 Martin et al.
2022/0324226 A1 10/2022 Dafinoiu et al.
2022/0371348 A1 11/2022 Praharaj et al.

* cited by examiner

*Primary Examiner* — Lam S Nguyen
(74) *Attorney, Agent, or Firm* — Maginot, Moore & Beck, LLP

(57) ABSTRACT

A printer and method of operating the printer adjusts firing signal waveforms for inkjets that eject at least one ink drop into one or more ink images produced by the printer to reduce the ink drop variability of the ink drops ejected into the one or more images. A range of acceptable ink drop volumes is identified using a nominal ink drop volume and a maximum ink drop volume deviation. The firing signals for the inkjets outside of this identified range are adjusted to shift the ink drops ejected by these inkjets into the range of acceptable ink drop volumes.

20 Claims, 9 Drawing Sheets

SYSTEM AND METHOD FOR CONTROLLING INKJET OPERATION IN AN INKJET PRINTER USING IMAGE CONTENT DATA

TECHNICAL FIELD

This disclosure relates generally to inkjet printers, and more particularly, to printheads having inkjets that are operated with firing signals.

BACKGROUND

Inkjet printers include one or more printheads that are operated to produce ink images on substrates. The printheads typically have an array of inkjets, which include transducers that receive firing signals to activate the transducers and eject a drop of ink from an inkjet. Operating the inkjets at high frequencies exacerbates the resonance effects at the nozzle. These resonance effects lead to a steep slope in the ejected ink drop volume versus area coverage graph. This slope is expected behavior arising from the interaction of a typical double drop ejection waveform, such as the one shown in FIG. 8, coupled with the operation of the inkjet at a high frequency. The graph of the drop volume versus area coverage for two printheads having different operating frequencies is shown in FIG. 9. The printhead having inkjets that can be operated at higher frequencies has a steeper drop volume versus area coverage slope for the line fitted to the data points for that printhead. Being able to adjust the operation of the inkjets in the printhead operating at the higher frequency so the slope of the drop volume versus area coverage is less steep would be beneficial for the image quality of the ink images printed by that printhead.

SUMMARY

A new inkjet printer is configured to operate the inkjets in a printhead operating at a high frequency so the slope of the drop volume versus area coverage is less steep. The printer includes a plurality of printheads, each printhead being configured to eject ink drops onto a substrate as the substrate passes each printhead in a process direction, a plurality of printhead drivers, each printhead driver being operatively connected to one of the printheads in the plurality of printheads in a one-to-one correspondence and each printhead driver being configured to operate inkjets within the one printhead operatively connected to the printhead driver, and a controller operatively connected to each printhead driver. The controller is configured to: receive ink image content data for each ink image to be printed in a print job; identify inkjets to be operated that eject ink drops having a volume outside a range of ink drop volumes about a nominal ink drop volume; and identify a firing signal waveform adjustment for each inkjet identified as being outside the range of ink drop volumes about the nominal ink drop volume. Each printhead driver is further configured to generate firing signals for the inkjets identified as being outside of the range of ink drop volumes about the nominal ink drop volume that are operatively connected to the printhead driver using the identified firing signal waveform adjustment.

A method of printer operation operates the inkjets in a printhead operating at a high frequency so the slope of the drop volume versus area coverage is less steep. The method includes receiving ink image content data for each ink image to be printed in a print job, identifying inkjets in a plurality of printheads that are operated to eject ink drops having a volume outside a range of ink drop volumes about a nominal ink drop volume, identifying a firing signal waveform adjustment for each inkjet identified as being outside the range of ink drop volumes about the nominal ink drop volume, and generating firing signals for the inkjets identified as being outside of the range of ink drop volumes about the nominal ink drop volume using the identified firing signal waveform adjustment.

BRIEF DESCRIPTION OF THE DRAWINGS

The foregoing aspects and other features of a printer and method of printer operation that operate the inkjets in a printhead operating at a high frequency so the slope of the drop volume versus area coverage is less steep are explained in the following description, taken in connection with the accompanying drawings.

DETAILED DESCRIPTION

Figure 1:
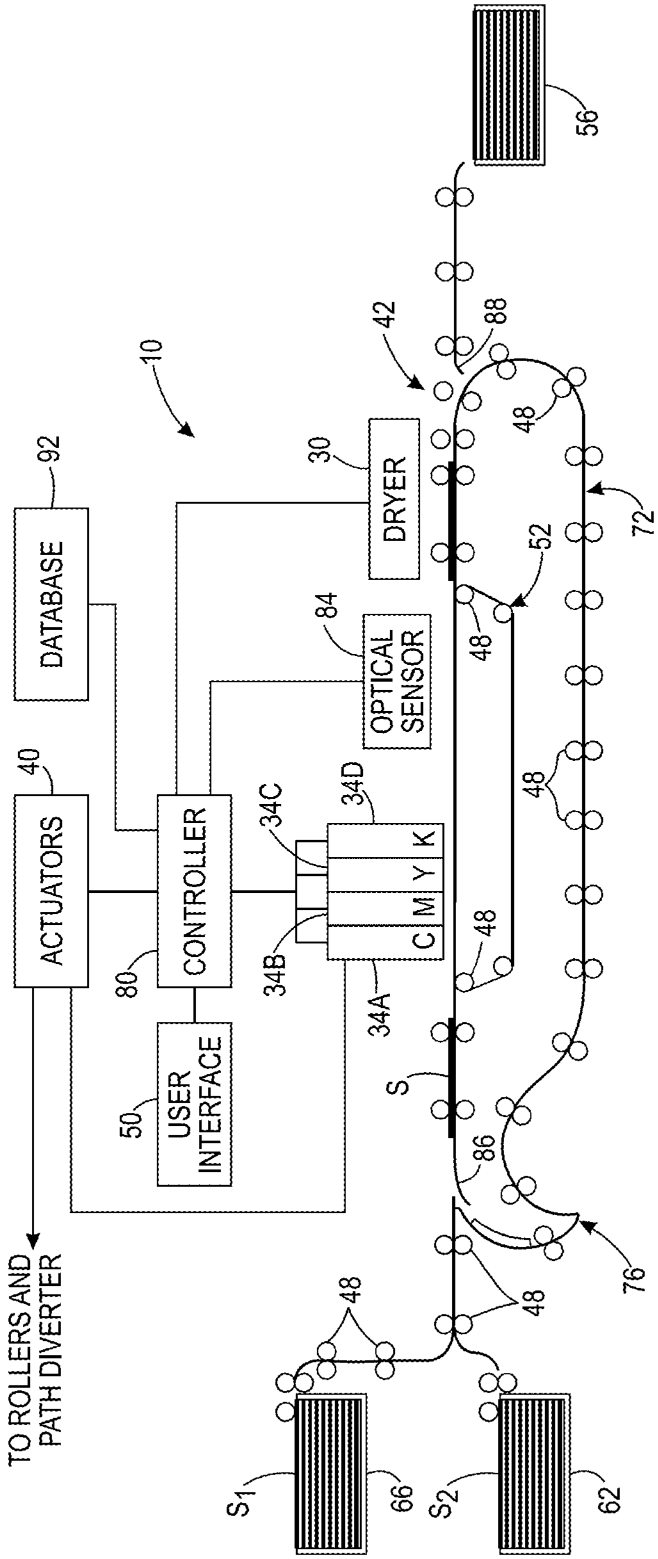
FIG. 1 is a diagram of a printer that operates the inkjets in a printhead operating at a high frequency so the slope of the drop volume versus area coverage is less steep.

For a general understanding of the present embodiments, reference is made to the drawings. In the drawings, like reference numerals have been used throughout to designate like elements.

A printing system 10 configured to operate the inkjets in a printhead operating at a high frequency so the slope of the drop volume versus area coverage is less steep is shown in FIG. 1. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers or to at least one driving roller of conveyor 52 that comprises a portion of the media transport 42 that passes through the print zone PZ of the printer. As used in this document, the term “print zone” means the portion of the media transport that is opposite any of the printhead assemblies in the printer.

The printer 10 is configured to perform print jobs sent to the printer by an external data source. As used in this document, the term “print job” means ink image content data for an ink image to be produced by a printer and the print job parameters at which the printer is operated to produce the ink image. The ink image content data is sent to the controller 80 from either an external data source, such as a scanning system or an online or work station connection. The ink image content data is processed to generate the inkjet ejector firing signals delivered to the printheads in the modules 34A-34D. Along with the ink image content data, the controller also receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, media manufacturer, and the like for executing a print job. As used in this document, the term "print job parameters" means non-image content data for a print job and the term "ink image content data" means digital data that identifies a color and a volume of each ejected ink drop that forms pixels in an ink image to be printed on a media sheet.

In one embodiment, each printhead module of the printer 10 has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

The media transport 42 includes a belt for moving print media, such as paper sheets, envelopes, or any other article suitable for receiving printed images, through the print zone so the printheads can eject ink drops onto the moving media to form printed images on the media. The belt has holes in it and the belt moves over a vacuum plenum within the conveyor 52 so a suction force can be generated through the surface of the belt. Each print medium engages a portion of the holes on the surface of the belt and the suction force holds the print medium to the surface of the belt to prevent the print media from slipping or otherwise moving relative to the surface of the belt as the belt moves through the printer. Holding each print medium in place relative to the surface of the moving belt enables the printer to control the timing of the operation of printheads to ensure that the printheads form printed images in proper locations on each print medium and ensures that the print media do not cause jams or other mechanical issues with the printer. In large-scale printer configurations, the belt often carries multiple print media simultaneously.

With continued reference to FIG. 1, a printed image on a substrate passes under an image dryer 30 after the ink image is fixed onto a sheet S. The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

A duplex path 72 is provided to receive a sheet from the media transport 42 after a substrate has been completely or partially printed and passed through the dryer 30 and move the sheet by the rotation of rollers in a direction opposite to the direction of movement in the process direction past the printheads. At position 76 in the duplex path 72, an inverter can be operated by the controller to selectively turn the printed substrate over before merging it into the job stream being carried by the media transport 42 so the opposite side of the printed substrate can be printed. If the inverter is not operated, then the substrate is not inverted and additional image portions are printed on the printed side of the substrate after the substrate is merged into the job stream. Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise as shown in FIG. 1, a substrate from media transport 42 is diverted to the duplex path 72. Rotating the pivoting member 88 in the clockwise direction from the diverting position closes access to the duplex path 72 so substrates on the media transport move to the receptacle 56. Another pivoting member 86 is positioned between position 76 in the duplex path 72 and the media transport 42. When controller 80 operates an actuator to rotate pivoting member 86 in the counterclockwise direction, a substrate from the duplex path 72 merges into the job stream on media transport 42. Rotating the pivoting member 86 in the clockwise direction closes the duplex path access to the media transport 42.

As further shown in FIG. 1, the printed media sheets S not diverted to the duplex path 72 are carried by the media transport to the sheet receptacle 56 in which they are be collected. Before the printed sheets reach the receptacle 56, they pass by an optical sensor 84. The optical sensor 84 generates image data of the printed sheets. The optical sensor 84 can be a digital camera, an array of LEDs and photodetectors, or other devices configured to generate image data of a passing surface. This image data is analyzed by the controller 80 to evaluate image quality of the printed ink images. In one embodiment, the controller 80 evaluates image quality be being configured to detect streakiness in the printed images on the media sheets of a print job. Additionally, sheets that are printed with test pattern images are inserted at intervals during the print job. These test pattern images are analyzed by the controller 80 to determine which inkjets, if any, that were operated to eject ink into the test pattern did in fact do so, and if an inkjet did eject an ink drop whether the drop landed at its intended position with an appropriate mass. Any inkjet not ejecting an ink drop it was supposed to eject or ejecting a drop not having the right mass or landing at an errant position is called an inoperative inkjet in this document. The controller can store data identifying the inoperative inkjets in database 92 operatively connected to the controller. These sheets printed with the test patterns are sometimes called run-time missing inkjet (RTMJ) sheets and these sheets are discarded from the output of the print job. A user can operate the user interface 50 to obtain reports displayed on the interface that identify the number of inoperative inkjets and the printheads in which the inoperative inkjets are located. While FIG. 1 shows the printed sheets as being collected in the sheet receptacle, they can be directed to other processing stations (not shown) that perform tasks such as folding, collating, binding, and stapling of the media sheets.

Figure 8:
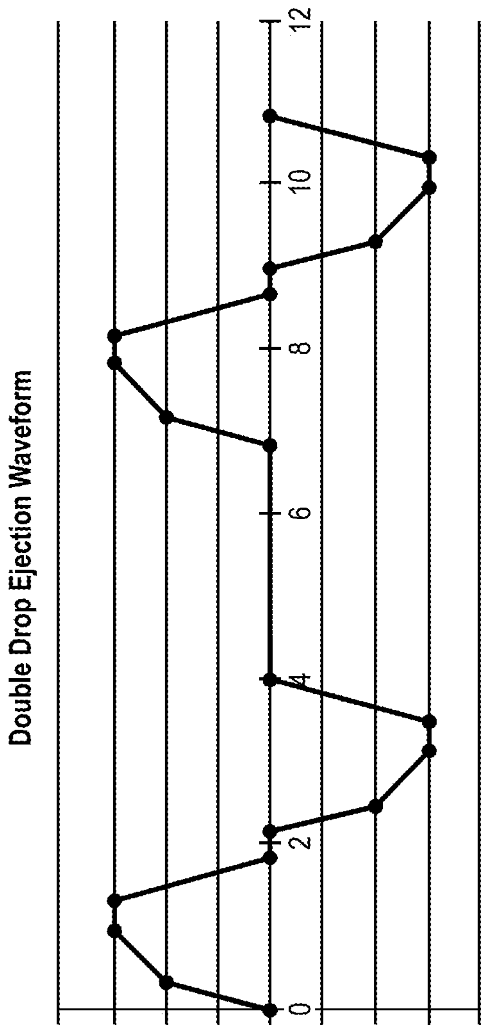
FIG. 8 depicts a double drop ejection firing signal waveform.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image content data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process. Additionally, each printhead module 34A-34D includes a printhead driver for each printhead in the module. The printhead driver generates the firing signals for the inkjets within the printhead operatively connected to the printhead driver. As set forth in more detail below, the printhead drivers generate the firing signals with a predetermined waveform, such as the one shown in FIG. 8, unless the controller 80 has identified one or more inkjets within the printhead operatively connected to a printhead driver that requires a waveform adjustment. The controller 80 provides an identification of the inkjets requiring waveform adjustment and the waveform adjustment for those inkjets so the printhead drivers can generate the firing signals appropriately.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, ink image content data for an ink image to be produced is sent to the controller 80 from either a scanning system or an online or work station connection. The ink image content data is processed to generate the inkjet ejector firing signals delivered to the printheads in the modules 34A-34D. As discussed in more detail below, the ink image content data for a single ink image to be printed or the ink image content data for a predetermined number of ink images are analyzed to identify which inkjets eject ink drops into high coverage areas and which inkjets eject ink drops into low coverage areas. The operation of these identified inkjets is adjusted to flatten the drop volume versus coverage area graph.

Along with the ink image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "ink image content data" means digital data that identifies a color and a volume of each ejected ink drop that forms pixels in an ink image to be printed on a media sheet.

Figure 2:
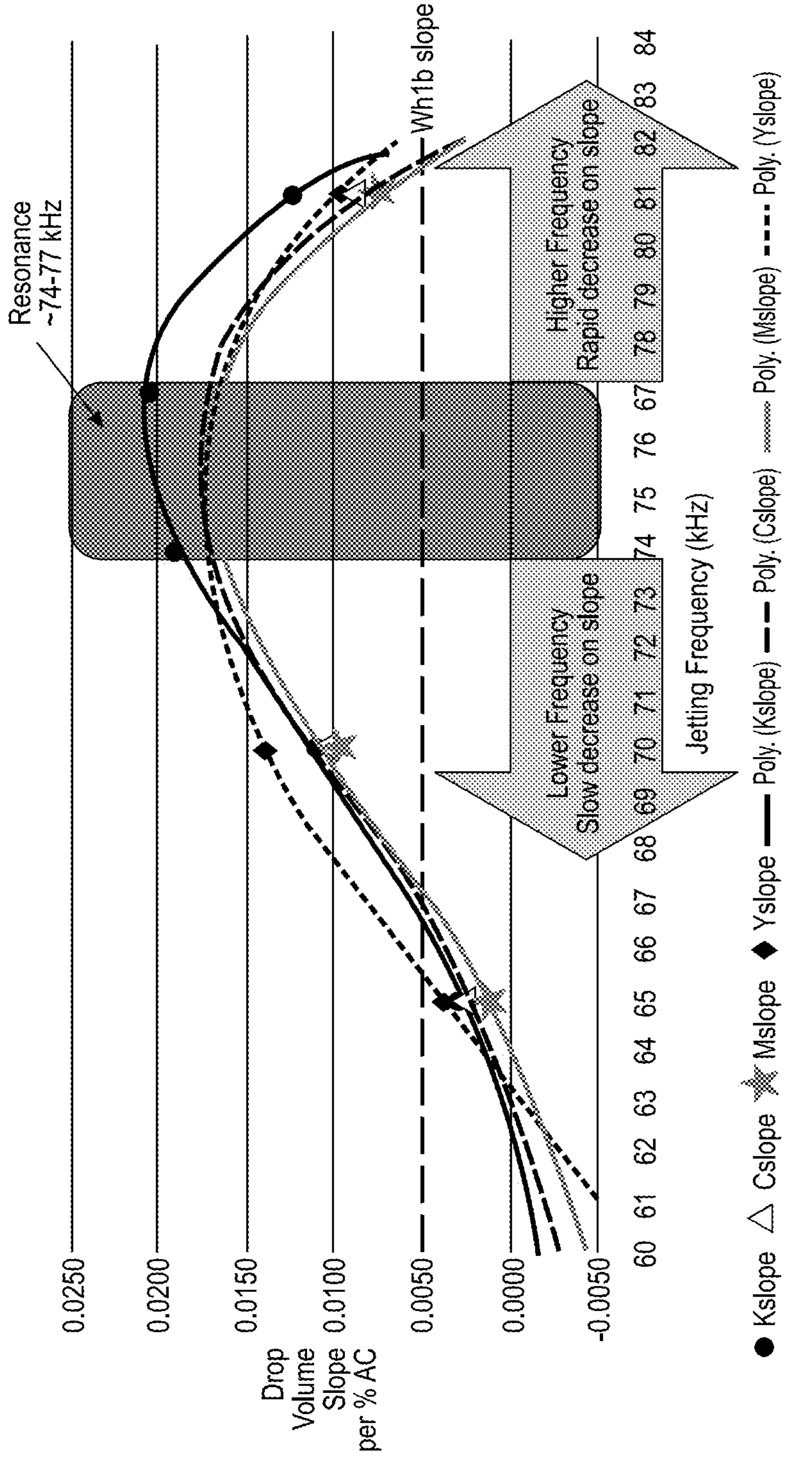
FIG. 2 is a graph of ink drop volume versus operating frequency of inkjets in printheads configured to eject different colors of ink.

FIG. 2 depicts data points for operating inkjets in printheads configured to operate inkjets with the printheads at a resonance frequency in the 74 KHz to 77 KHz range. If the inkjets are operated at a frequency above the resonance frequency then the slope of the curves fitted to the data points comparing the ink drop volume versus area coverage percentage changes more quickly than the slope of the curves fitted to the data points comparing the ink drop volume versus area coverage percentage changes for the inkjet frequencies below the resonance frequency range. These changes on either side of the resonance frequency range are steeper than the slope of the ink drop volume versus area coverage percentage line for the printhead having a lower resonance frequency. Thus, being able to operate the inkjets in a range of frequencies having a relative lesser change in the slope of the drop volume versus area coverage percentage would be advantageous for image quality. As used in this document, the term "resonance frequency" or "resonance frequency range" means a single frequency or a range of frequencies, respectively, which are the highest frequency or range of frequencies, respectively, at which an inkjet in a printhead can be operated without changing a predetermined ink drop volume for ink drops ejected by the inkjets in the printhead to a volume that degrades image quality.

Figure 3:
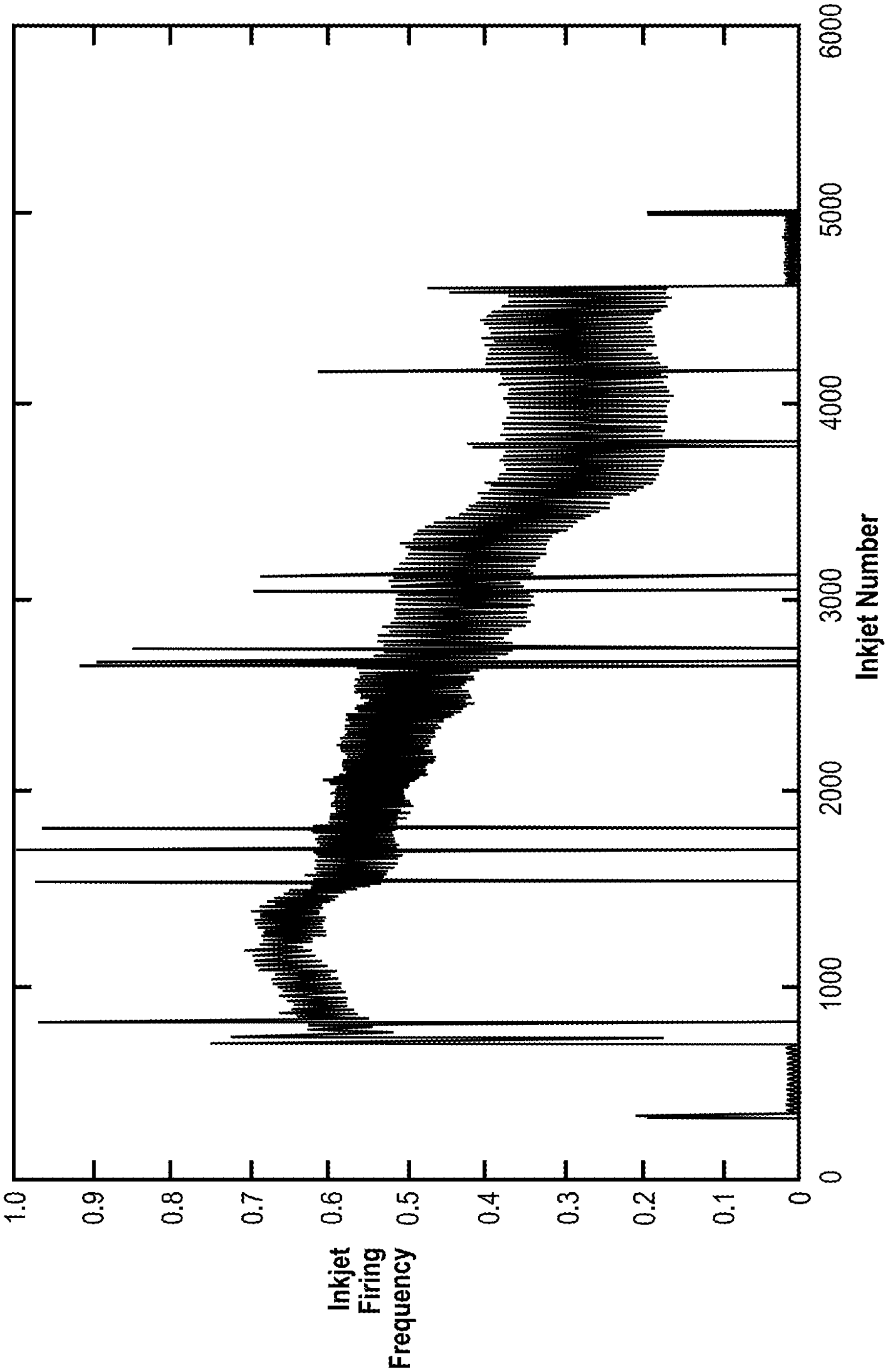
FIG. 3 is a graph of the operating frequency for each inkjet in a printhead during the printing of a typical color separation for an ink image.
Figure 4:
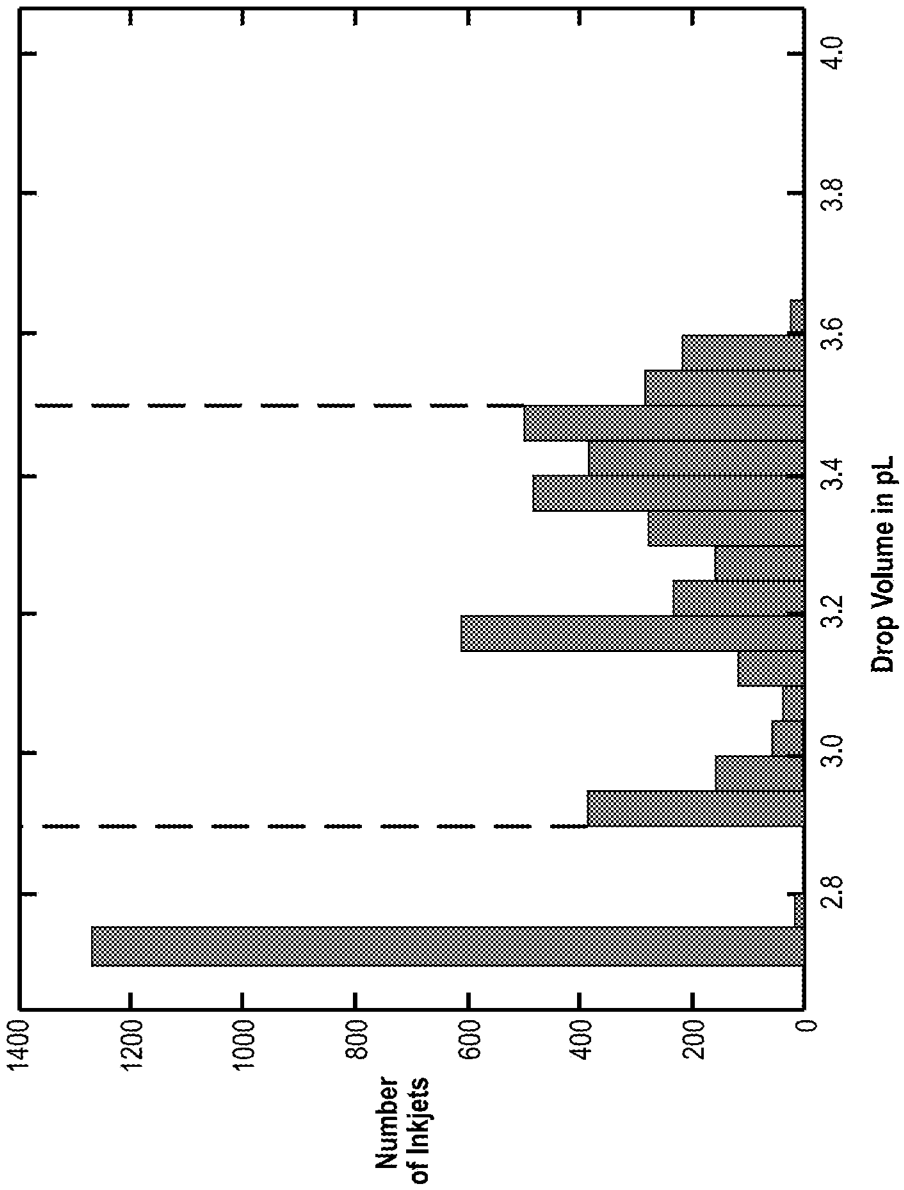
FIG. 4 depicts a histogram of the ejected drop volumes for the inkjets shown in FIG. 3.
Figure 5:
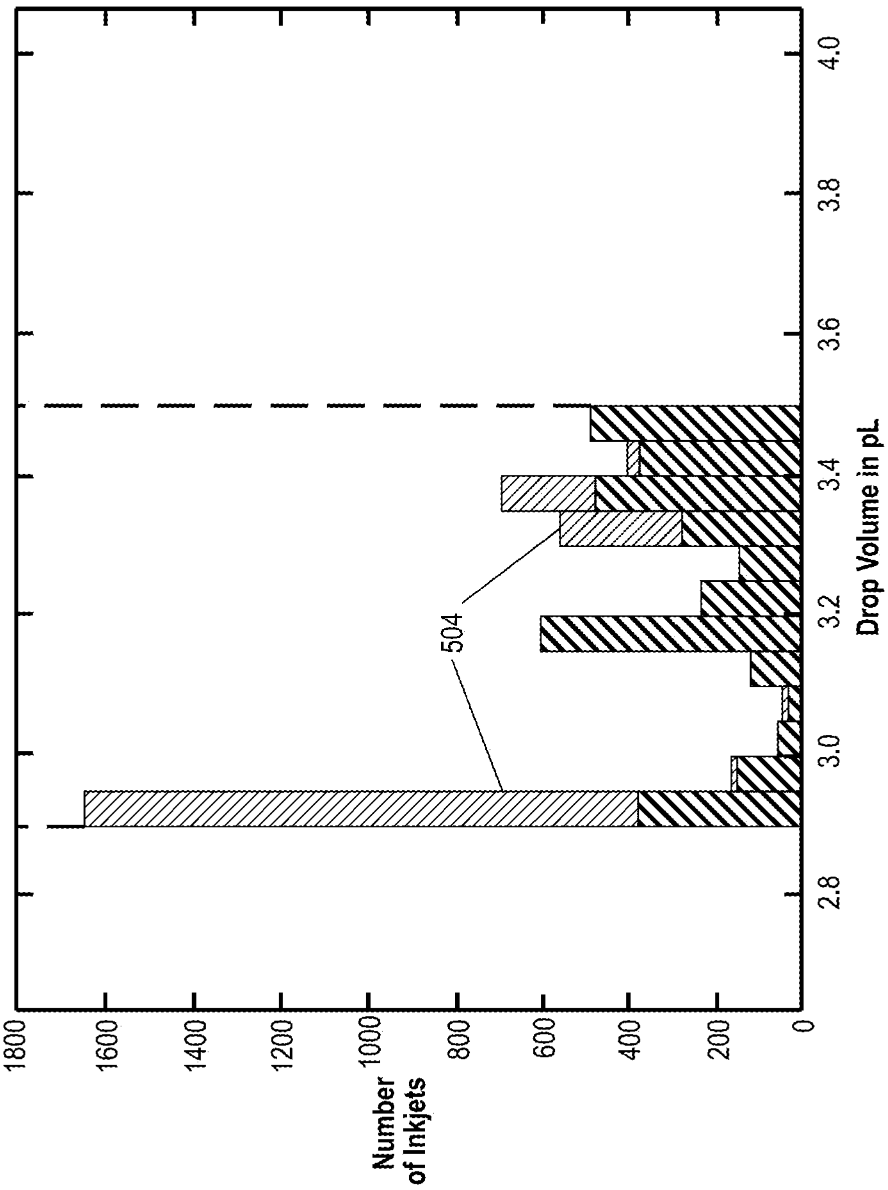
FIG. 5 depicts a histogram of the ejected drop volumes for the inkjets of FIG. 4 after the firing signal waveform has been adjusted.
Figure 9:
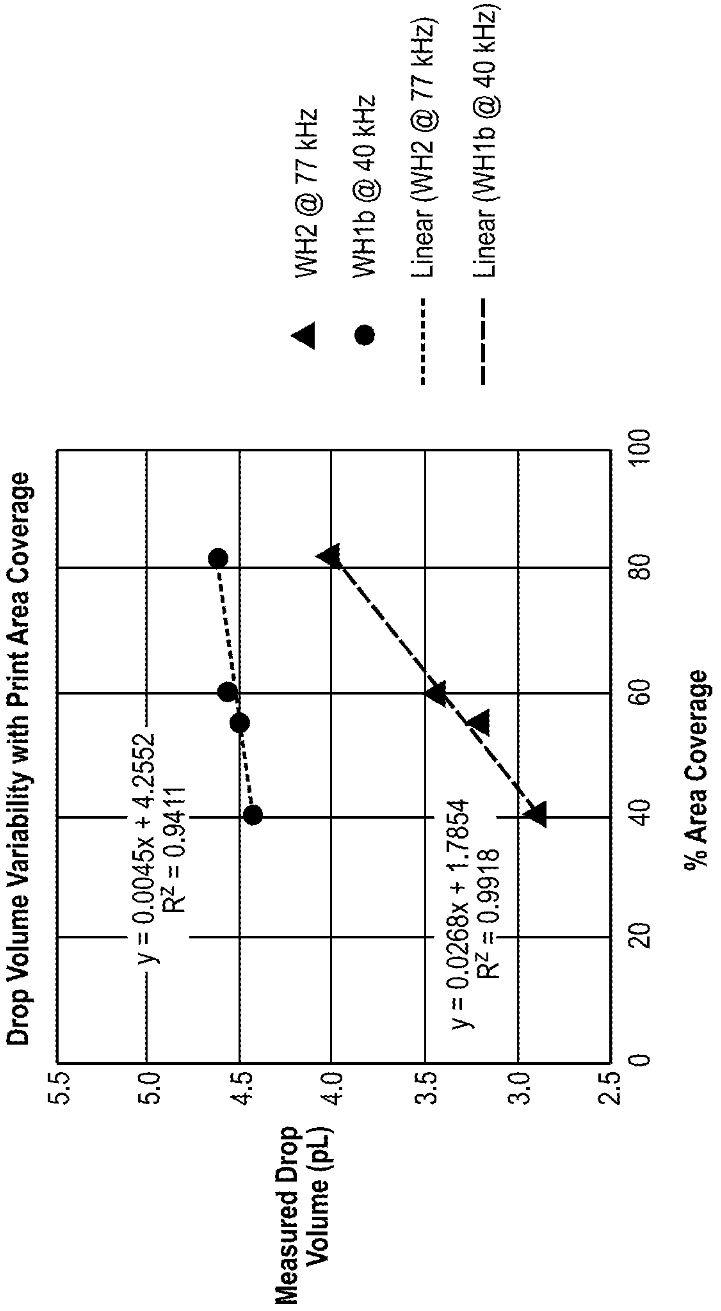
FIG. 9 is a graph of ink drop volume variability versus print area coverage.

The graph of FIG. 3 depicts a firing frequency for each inkjet in a printhead to form a typical color separation for an ink image. In the graph, the inkjet firing frequency is normalized to the maximum firing frequency of the inkjets in the printhead so a frequency of 1.0 corresponds to a 100% area coverage. Using the drop volume versus area coverage graph from FIG. 9, a histogram for the number of inkjets that eject each drop volume in the color separation used for the graph in FIG. 3 can be produced. Such a histogram is shown in FIG. 4. The range for the ejected drop volumes forming one or more images can be identified from such a histogram. The nominal drop volume is identified as a midpoint or an average ejected drop volume from this range of ink drop volumes. A maximum ink drop deviation is then identified to set a range of ink drop volumes for the inkjets so the inkjets outside of the range do not exhibit a large ink drop variability, which affects image quality. To move the operation of the inkjets outside of the range, their firing waveform is altered so the inkjets eject ink drops with a volume within the identified range to mitigate significant deviations from the nominal drop volume. For example, a maximum ink drop variation of 10% of the nominal drop volume can be used. In the histogram of FIG. 4, the nominal drop volume is about 3.2 pl so the range imposed on the histogram of FIG. 4 extends from about 2.88 pl to about 3.52 pl and is indicated by the two dashed lines in the histogram. Thus, the inkjets outside of this range need to be distributed within this drop volume range. The firing signal waveform for any inkjet outside of this acceptable range is adjusted to bring the drop volume for the inkjet within the acceptable range. One adjustment of the waveform is achieved by changing the amplitude for the waveform. By assuming a linear relationship between the ejected drop volume and the operating voltage of 0.2 pl/V, the amplitude waveforms for the inkjets outside of the acceptable range are adjusted. Operating these inkjets with the adjusted waveforms results in the histogram presented in FIG. 5 that shows the redistribution of the inkjets outside of the range to the new drop volumes 504.

Figure 6:
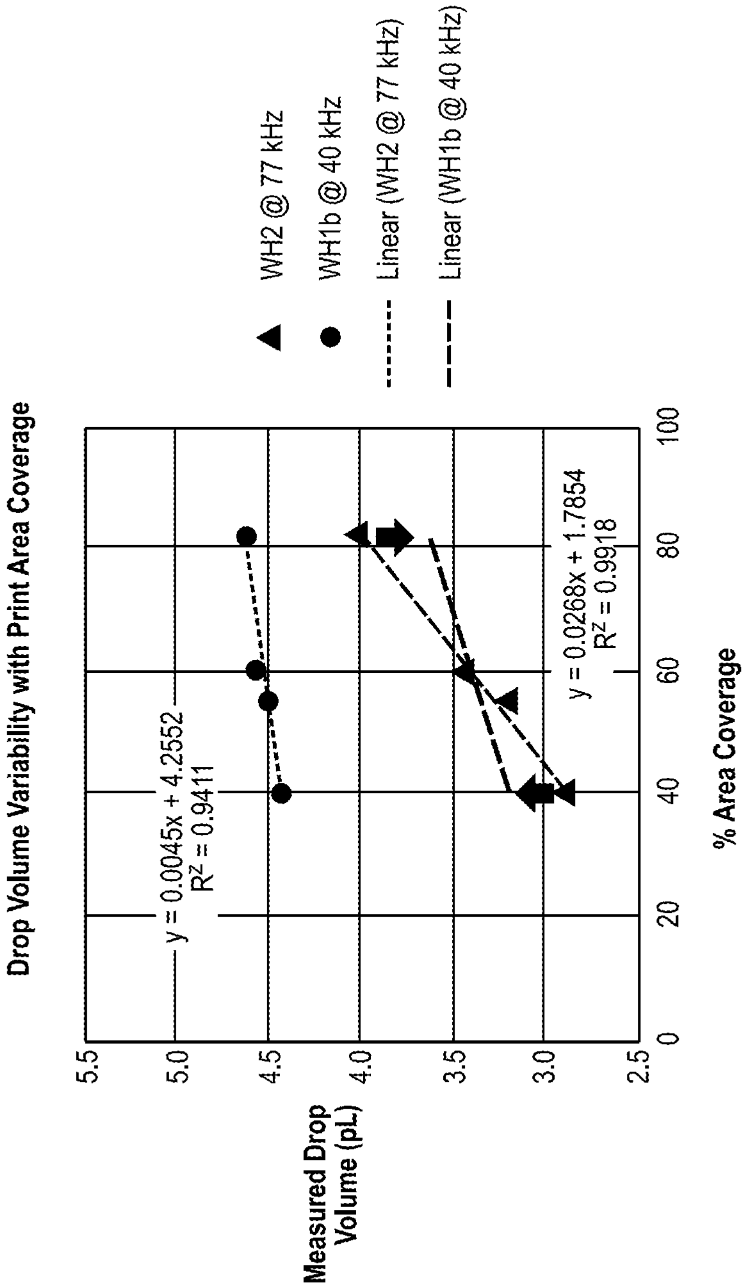
FIG. 6 is a graph of a corrected drop volume versus area coverage curve after the waveform adjustment is performed for some of the inkjets in the printheads of FIG. 1.

The waveform adjustment determined for the inkjets outside of the acceptable range can be identified for each ink image to be printed in a print job or it can be identified for an average of a predetermined number of images in the print job, such as several hundreds of images. This waveform adjustment also mitigates defects associated with large deviations from the nominal drop volume. A corrected drop volume versus area coverage curve is shown in FIG. 6. The arrows within the graph of FIG. 6 indicate the changes in the drop volume versus area coverage curve produced by the waveform adjustment. Again, maximum firing frequency correlates to 100% area coverage, zero frequency correlates to 0% area coverage, and linear scaling is used between these two points.

Figure 7:
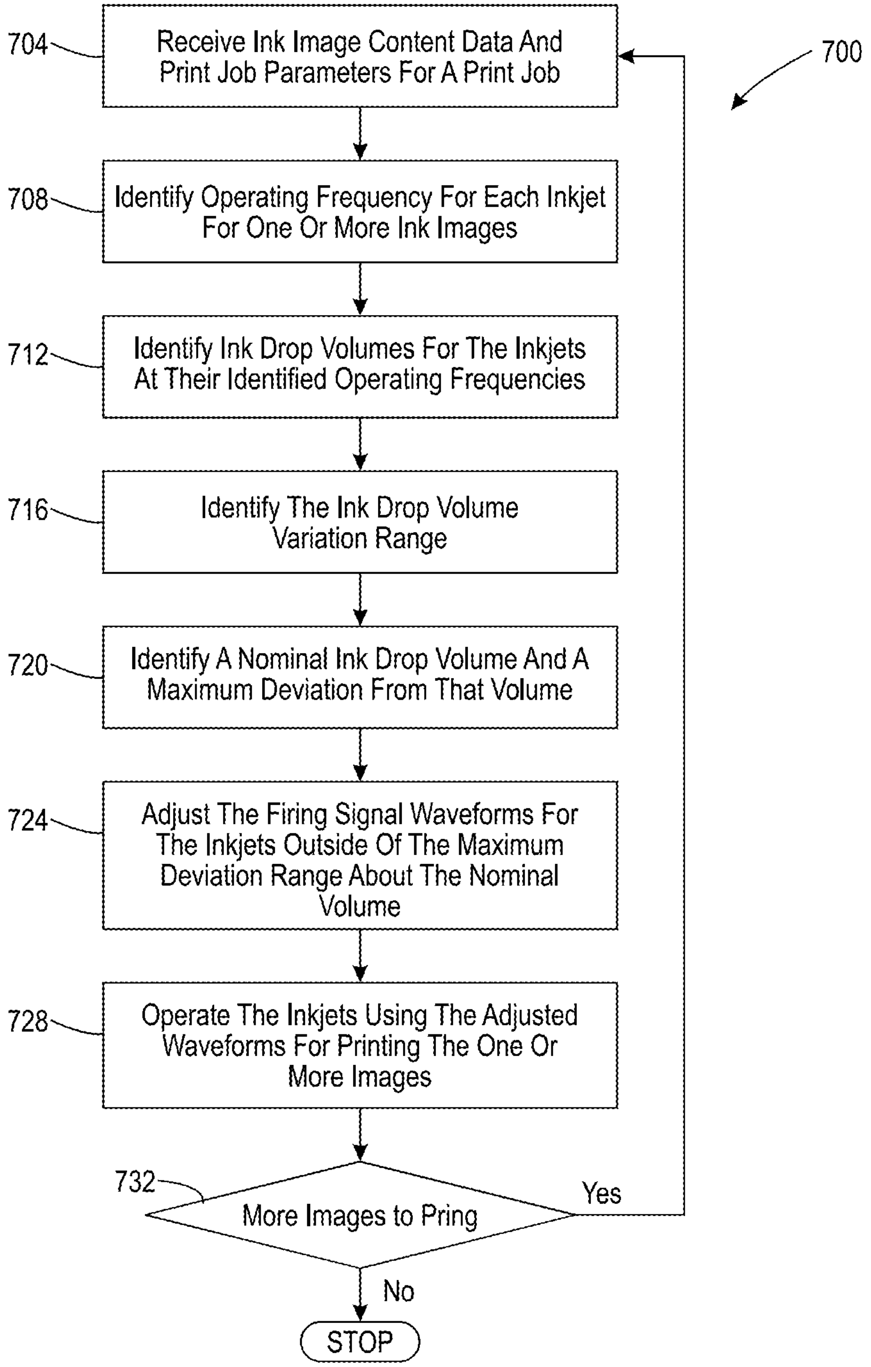
FIG. 7 is a flow diagram of a process used to adjust firing signal waveforms so the slope of the drop volume versus area coverage is less steep.

A process for operating the printer shown in FIG. 1 is shown in FIG. 7. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 80 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 7 is a flow diagram of a process 700 that operates the printer 10 to identify waveform adjustments for inkjets in the printheads of the printer 10 that print one or more images with the printer. The process 700 begins by receiving the ink image content data and print job parameters for a print job (block 704). Either for a single image or an average of a predetermined number of images, a frequency of inkjet operation is determined for each inkjet (block 708). An empirically determined ink drop variability versus print area coverage is used to identify the ink drop volumes to be ejected by the inkjets at the identified operational frequencies (block 712) and a histogram is generated that is used to identify a range of ink drop volumes used to form one or more ink images (block 716). A nominal ink drop volume is identified within this range of ink drop volumes, such as an average ink drop volume over the range of ejected ink drop volumes, and a maximum ink drop volume deviation is identified using that nominal volume, such as the 10% value noted previously. The nominal ink drop volume and the maximum ink drop volume deviation are used to identify a range of ink drop volumes over which all of the inkjets are to be distributed (block 720). The firing signal waveforms for the inkjets outside of the identified range are adjusted to distribute these inkjets within the identified range (block 724). These modified waveforms are used to operate the inkjets during the printing of the ink image or predetermined number of ink images (block 732). The identification of a suitable ink drop volume range and corresponding waveform adjustments continue until no further ink images are to be printed (block 736).

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A printer comprising:

a plurality of printheads, each printhead being configured to eject ink drops onto a substrate as the substrate passes each printhead in a process direction;

a plurality of printhead drivers, each printhead driver being operatively connected to one of the printheads in the plurality of printheads in a one-to-one correspondence and each printhead driver being configured to operate inkjets within the one printhead operatively connected to the printhead driver; and a controller operatively connected to each printhead driver, the controller being configured to:

receive ink image content data for each ink image to be printed in a print job;

identify a nominal ink drop volume based on the ink image content data;

identify, based at least in part on the received ink image content data for each ink image to be printed, inkjets to be operated during the print job that eject ink drops having a volume outside a range of ink drop volumes about the nominal ink drop volume;

identify a firing signal waveform adjustment for each inkjet identified as being outside the range of ink drop volumes about the nominal ink drop volume; and each printhead driver being further configured to generate firing signals for the inkjets identified as being outside of the range of ink drop volumes about the nominal ink drop volume that are operatively connected to the printhead driver using the identified firing signal waveform adjustment, wherein the firing signals are generated for use during the print job.

2. The printer of claim 1 wherein the identified firing signal waveform adjustment is a change in an amplitude of a waveform used by at least the printhead drivers to generate firing signals for the inkjets identified as being outside of the range of ink drop volumes about the nominal ink drop volume.

3. The printer of claim 1, the controller being further configured to identify the range of ink drop volumes by:

identifying a frequency of inkjet operation for each inkjet ejecting at least one ink drop into at least one ink image in the ink image content data;

identifying an inkjet drop volume ejected by each inkjet ejecting at least one ink drop into the at least one ink image;

identifying the nominal ink drop volume using the identified ink drop volumes for the inkjets ejecting at least one ink drop into the at least one ink image; and identifying the range of ink drop volumes about the nominal ink drop volume using a maximum ink drop volume deviation.

4. The printer of claim 3, the controller being further configured to identify the nominal drop volume by:

identifying an average ink drop volume of the identified drop volumes for the inkjets ejecting at least one ink drop into the at least one ink image.

5. The printer of claim 4 wherein the maximum ink drop volume deviation is a predetermined percentage of the nominal ink drop volume.

6. The printer of claim 5 wherein the range of ink drop volumes is the nominal ink drop volume ±10% of the nominal ink drop volume.

7. The printer of claim 3, the controller being further configured to identify the ink drop volumes for each inkjet ejecting at least one ink drop into the at least one ink image by:

applying a ink drop volume variability versus print area coverage function to the identified inkjet operation frequencies.

8. The printer of claim 7 wherein the print volume variability versus print area coverage function corresponds to a printhead having a resonant frequency in a range of 74 KHz to 77 KHz.

9. The printer of claim 3, the controller being configured to:

identify the frequency of inkjet operation for a plurality of inkjets ejecting at least one ink drop into a plurality of ink images in the ink image content data.

10. The printer of claim 9, the controller being further configured to:

identify the frequency of inkjet operation using a linear scale between a zero firing signal frequency and a maximum inkjet firing signal frequency and a percentage of area coverage into which the inkjet ejects ink.

11. A method for operating a printer comprising:

receiving ink image content data for each ink image to be printed in a print job by inkjets in a plurality of printheads;

identify a nominal ink drop volume for the inkjets in the plurality of printheads based on the received ink image content data;

identifying, based at least in part on the received image content data for each ink image to be printed, inkjets in the plurality of printheads to be operated during the print job that eject ink drops having a volume outside a range of ink drop volumes about a nominal ink drop volume;

identifying a firing signal waveform adjustment for each inkjet identified as being outside the range of ink drop volumes about the nominal ink drop volume; and generating, during the print job, firing signals for the inkjets identified as being outside of the range of ink drop volumes about the nominal ink drop volume using the identified firing signal waveform adjustment.

12. The method of claim 11, the identification of the firing signal waveform adjustment further comprising:

changing an amplitude of a waveform used to generate firing signals for the inkjets identified as being outside of the range of ink drop volumes about the nominal ink drop volume.

13. A method for operating a printer comprising:

receiving ink image content data for each ink image to be printed in a print job;

identifying inkjets in a plurality of printheads that are operated to eject ink drops having a volume outside a range of ink drop volumes about a nominal ink drop volume;

identifying a firing signal waveform adjustment for each inkjet identified as being outside the range of ink drop volumes about the nominal ink drop volume; and generating firing signals for the inkjets identified as being outside of the range of ink drop volumes about the nominal ink drop volume using the identified firing signal waveform adjustment;

the identification of the range of ink drop volumes further comprising:

identifying a frequency of inkjet operation for each inkjet ejecting at least one ink drop into at least one ink image in the ink image content data;

identifying an inkjet drop volume ejected by each inkjet ejecting at least one ink drop into the at least one ink image;

identifying the nominal ink drop volume using the identified ink drop volumes for the inkjets ejecting at least one ink drop into the at least one ink image; and identifying the range of ink drop volumes about the nominal ink drop volume using a maximum ink drop volume deviation.

14. The method of claim 13, the identification of the nominal drop volume further comprising:

identifying an average ink drop volume of the identified drop volumes for the inkjets ejecting at least one ink drop into the at least one ink image.

15. The method of claim 14, the identification of the maximum ink drop volume deviation further comprising:

multiplying the nominal ink drop volume by a predetermined percentage.

16. The method of claim 14, the identification of the range of ink drop volumes further comprising:

multiplying the nominal ink drop volume by 10% to identify the maximum ink drop volume deviation; and adding and subtracting the maximum ink drop volume deviation to and from the nominal ink drop volume to identify endpoints of the range of ink drop volumes.

17. The method of claim 13, the identification of the ink drop volumes for each inkjet ejecting at least one ink drop into the at least one ink image further comprising:

applying a ink drop volume variability versus print area coverage function to the identified inkjet operation frequencies.

18. The method of claim 17 wherein the print volume variability versus print area coverage function corresponds to a printhead having a resonant frequency in a range of 74 KHz to 77 KHz.

19. The method of claim 13, the identification of the inkjet operation frequencies further comprising:

identifying the frequency of inkjet operation for a plurality of inkjets ejecting at least one ink drop into a plurality of ink images in the ink image content data.

20. The method of claim 19 further comprising:

identifying the frequency of inkjet operation using a linear scale between a zero firing signal frequency and a maximum inkjet firing signal frequency and a percentage of area coverage into which the inkjet ejects ink.

* * * * *